United States Patent
Pomper et al.

[15] 3,671,021
[45] June 20, 1972

[54] EXTRUDER AND SCREW THEREFOR WITH UNDERCUT MELT CONDUCTING CHANNEL

[72] Inventors: Anthony W. Pomper, Edison; Lloyd Kovacs, Somerset, both of N.J.

[73] Assignee: Midland-Ross Corporation

[22] Filed: Aug. 26, 1970

[21] Appl. No.: 66,915

[52] U.S. Cl.....................259/109, 18/12 SM, 416/176
[51] Int. Cl........................................B01f 7/02, B29f 3/02
[58] Field of Search.................18/12 SM, 30 SM; 416/176; 259/109, DIG. 11

[56] References Cited

UNITED STATES PATENTS

| | | | |
|---|---|---|---|
| 3,123,860 | 3/1964 | Vesilind | 18/12 SM |
| 2,343,529 | 3/1944 | Brown | 18/12 SM |
| 3,271,819 | 9/1966 | Lacher | 18/12 SM |
| 3,358,327 | 12/1967 | Maillefer | 18/12 SM |
| 3,375,549 | 4/1968 | Gever | 18/12 SM |
| 3,445,890 | 5/1969 | Heston et al. | 18/12 SM |

FOREIGN PATENTS OR APPLICATIONS 420,581   3/1967   Switzerland.........................18/12 SM

*Primary Examiner*—J. Spencer Overholser
*Assistant Examiner*—Michael O. Sutton
*Attorney*—Woodrow Portz and Irvin L. Groh

[57] ABSTRACT

A screw type extruder for reducing a solid thermoplastic material to a fluid wherein a spiral body of uniform width of the material is maintained in continuous contact with the barrel of the extruder and the screw is formed with a secondary or subchannel arranged substantially underneath a solid body supported within the main channel for conducting the melted material toward the discharging end of the extruder.

9 Claims, 12 Drawing Figures

PATENTED JUN 20 1972

INVENTOR.
A.W. POMPER
LLOYD KOVACS
BY
M Portz
ATTORNEY

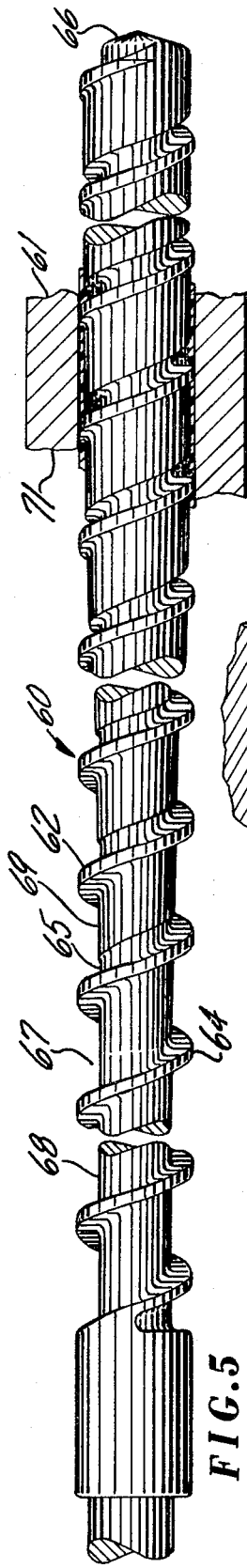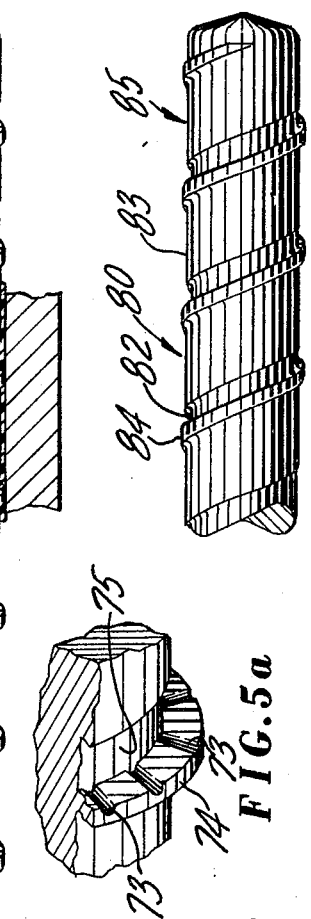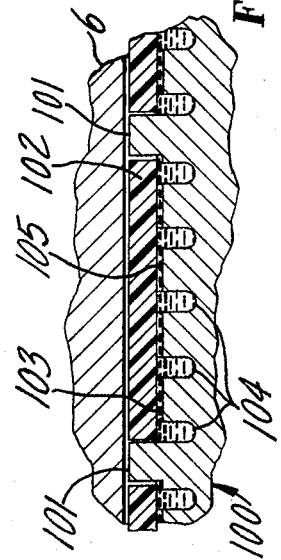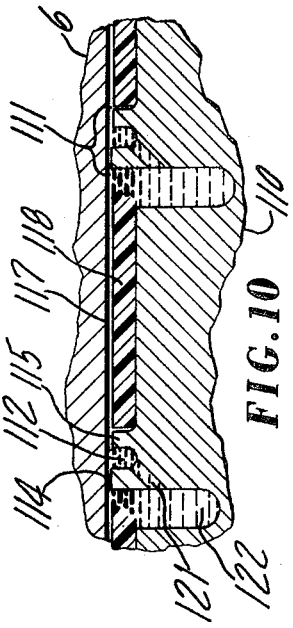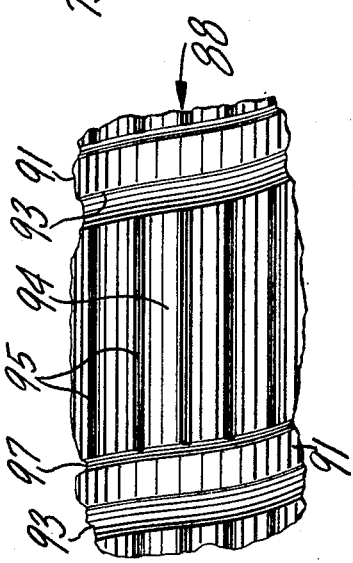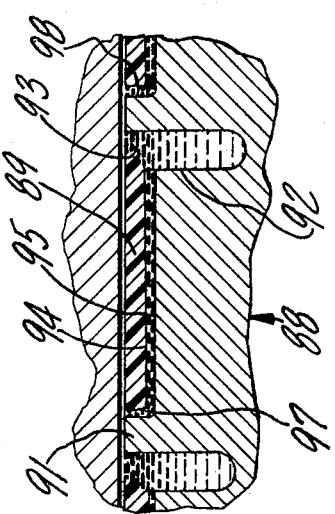

EXTRUDER AND SCREW THEREFOR WITH UNDERCUT MELT CONDUCTING CHANNEL

DESCRIPTION

The present invention is an extension of extruder development disclosed by Lloyd Kovacs in U.S. Pat. application Ser. No. 23,200 and coworker Robert Barr in U.S. Pat. application Ser. No. 799,430, now abandoned, respectively. The screw type extruders disclosed in those applications and in the present application all operate to form a solid spiral body of thermoplastic material coalesced usually from pellets or other particulate matter fed into the feeding section of the extruder. According to this operating principle, it is essential that a solid body be supported in a channel of the screw of uniform width so that the solid body is not subjected to any lateral stresses which might fracture or otherwise disintegrate the body in a way that melted material could be interspersed with solid material being traversed through the melting section of the extruder. In the extruders of these prior disclosures, the solid body being melted is supported between equi-spaced turns of the tread and between the barrel and a channel bottom surface extending continuously across the full width of the channel. The channel bottom surface increases in radius from the screw axis toward the front or discharge end of the extruder.

In achieving the present invention, the realization was reached that the solid spiral body may be supported within the melting section of an extruder in a channel of uniform width with the bottom channel surface being undercut for a narrow portion of the width of the main channel to provide a melt-conducting subchannel. As long as the width of the subchannel is very narrow as compared with the total width of the main channel, the solid body may be supported against the barrel surface by the channel bottom surface substantially as effectively as if the undercut subchannel were not formed therein.

In one preferred embodiment of the invention, a subchannel is cut next to the rear side of the thread in order that the melt may be forwarded to the front end of the extruder along the low pressure side of the channel, since the barrel tends to wipe melted material toward the rear side of the channel as defined by the front side of the thread. Openings through the thread are provided which extend from the front side of the thread on an inward radial bias to the rear side thereof into junction with the undercut subchannel. The subchannels are restricted in size or capacity to induce a rapid movement of melt therethrough such as to create a washing action or erosion on any solid material which protrudes thereinto, and to provide supporting pressure for the portion of the solid plastic body extending over the subchannel. The thread and the channel forming areas may be shaped in various ways to implement movement of the melt from a high pressure region adjacent the lead side of the thread to the relatively low pressure region of the subchannel.

In the drawing with respect to which the invention is described:

FIG. 1 is a fragmentary, longitudinally shortened view partly in cross section of an assembly comprising an extruder barrel and screw;

FIG. 2 is a fragmentary, longitudinal view of an extruder screw constructed similarly to that illustrated in FIG. 1 except for a modified front end material-discharging portion;

FIG. 3 is a fragmentary, longitudinal view partly in section illustrating a portion of a screw of the same general construction as that of FIG. 1 but having a thread of modified design;

FIG. 3a is a fragmentary enlargement of a sectioned portion of FIG. 3;

FIG. 4 is a fragmentary, longitudinal view of extruder portions comprising a screw barrel assembly wherein a major portion of the screw may be constructed as shown in FIG. 1 with a minor portion of the screw extending rearwardly from its front end to form metering and vapor venting sections;

FIG. 5 is a fragmentary, longitudinally shortened view of a barrel and screw assembly illustrating a modified arrangement for providing a melt-conducting subchannel extending the entire length of the melting section to the front end of the screw;

FIG. 5a is a fragmentary perspective view of a screw portion utilizing a subchannel similar to that of the screw in FIG. 5 but having a modified thread;

FIG. 6 is a longitudinal view of a front-end portion of a screw having a subchannel similar to that of FIG. 1 but which terminates rearwardly of the front end of the screw to provide a choke section;

FIG. 7 is a fragmentary side view of a screw constructed with a minor subchannel and a major subchannel at opposite sides of the main channel and interconnected by axially extending grooves;

FIG. 8 is a fragmentary section of the screw of FIG. 7 in association with a barrel illustrating the screw and the barrel in operating relationship;

FIG 9 is a fragmentary longitudinal sectional view of a modified screw providing a plurality of small subchannels in undercut relation with the main channel of the screw; and FIG. 10 is a fragmentary sectional view of a barrel and screw assembly wherein the screw thread is of special construction adapting it for the feeding of molten material to an adjacent subchannel.

FIG. 1 depicts an embodiment of the invention wherein a screw 5 is housed within a barrel 6. The screw 5 comprises a core 7 which gradually increases in diameter from the feed section 8 of the extruder to the front end 9 of the screw 5, and a single thread 10 shown extending the entire length of the screw. The thread is of conventional contour and is of uniform pitch so as to develop a channel 11, i.e., the continuous spiral space developed between the successive turns of the thread. The channel 11 is thus characterized by uniform width but gradually decreasing depth particularly with regard to that portion of the length of the screw corresponding to the melt section of the extruder. In FIG. 1, the melt section extends approximately from turn 14 of the thread to the end surface 9. As shown with respect to the embodiment of FIG. 1 and the other embodiments illustrated, the increase in diameter of the core and corresponding decrease in depth of the channel 11 is distributed over the length of the screw in the manner shown to cause the main bottom surface of the channel, e.g., surface 16, to extend in the lengthwise direction of the screw substantially parallel to the screw axis M—M.

The melt section of the screw shown in FIG. 1 is characterized by a subchannel 15 extending radially inwardly from the bottom surface 16 of the channel 11. It is thus in undercut relation with the channel or its bottom surface. The subchannel in this instance is located along the rear side of the thread 10 and subjacent the base of the thread. The melting section of the screw 5 is further characterized by a series of apertures 18 which extend through the thread from points along the base of the leading or front side of the thread to the rear side thereof to join with the subchannel 15. Preferably, the apertures 18 terminate within the subchannel at a radius smaller than that of the channel bottom surface 16.

Obvious from the drawing is that the subchannel of the various embodiments is relatively narrow with respect to the width of the main channel as defined by the successive turns of the thread. By way of example, the ratio of the width of the subchannel and the main channel may be of the order of 1 to a range of 6 to 8. The ratio selected is somewhat dependent upon the self-supporting nature of the solid plastic formed within the melting section and the pressures developed within the subchannel underneath the plastic body formed in the main channel. In practicing the present invention, it is essentially depth of the subchannel that is varied to obtain subchannel capacity sufficient for conducting melted plastic to the front end of the extruder.

In the operation of the embodiment of FIG. 1, it is recognized that the thread of the screw pushes the spiral plastic body in the forward direction of the extruder and causes higher pressure within the channel 11 adjacent the front side of the thread and somewhat lower pressure on the forward side of the channel, i.e., adjacent the rear side of the thread and within the subchannel 15. However, melted material at the interface of the barrel 6 of the plastic workload of the extruder is wiped rearwardly across the channel toward the front side of the thread. In the embodiment as shown in FIG. 1, sufficient hydraulic pressure is developed adjacent the front edge of the thread to place the spiral plastic body slightly away from the thread and allow the melt to enter the apertures 18. Movement of the melt into the apertures 18 may be facilitated by radially extending grooves in the front side of the thread in registry with the entrances to apertures 18. The melt readily escapes from the high pressure region into the relatively lower pressure region provided by the subchannel 15.

FIG. 2 illustrates a front portion of a modified screw 20, having its melt section terminating approximately with screw turn 21. At this point along the length of the screw, the subchannel 22 has reached its maximum depth and the core 23 of the screw has reached its maximum radius. The section of the screw extending from turn 21 to about turn 25 is a transition section in which the depth of the subchannel 22 decreases and the core diameter decreases to allow the main channel to become gradually deepened whereby melted material is displaced from the subchannel to a section of the main channel of increasing cross section. At about turn 25, the main channel 26 continues to the front end 27 of the screw at uniform depth. This section of the screw functions as a conventional metering section for placing a desired back pressure on the melt conducive to uniformity in the material output rate of the extruder.

FIGS. 3, 3a illustrate an important embodiment of the invention by illustrating a portion of a screw 30 occurring approximately at the beginning of its melt section of the screw 30.

The screw 30 has a subchannel 31 extending along rear side 32 of its thread 33 and in radially undercut relation with its main channel 34 similarly as found in the embodiments illustrated in FIGS. 1 and 2. The essential difference is in the thread construction. The outwardly radially facing surface of the thread 33 is divided along the melt section of the thread into the full diameter cylindrical surface 35 and a bevel surface 36. Along the portion of the screw having the bevel surface 36, i.e., within the melt section of the extruder, the thread is perforated with a series of apertures 38 which open in the bevel surface and extend therefrom rearwardly and radially inwardly through the thread to open on the rear side of the thread within or adjacent the subchannel 31. In operation, melted material is wiped rearwardly across the surface of the solid plastic body 40 occupying the main channel 34. The melted material collects in the hollow region 39 of triangular cross section bounded by the rear side 41 of the plastic body 40, the barrel 6, and the bevel surface 36. The melt readily drains off from the region 39 into the subchannel to join with a stream 42 of fluid fed by many other apertures 38. The fluid is pumped as a continuous body forwardly within the extruder to its front or discharge end through action of the screw.

FIG. 4 illustrates a front end portion of a screw which may be constructed with any thread and subchannel construction in accordance with this invention but, for purposes of illustration, incorporates the thread and subchannel structure of FIG. 1. FIG. 4 illustrates an extruder wherein a screw 45 has a subchannel 46 and an apertured portion of a thread 47 with apertures 48 similar to apertures 18 of the thread 10 which extend only through a melting section. The thread 47 continues forwardly without apertures with the core 49 smaller in diameter through a barrel section 51 having an opening 52 normally exposed to atmospheric pressure or vacuum to define a vapor-releasing zone of the extruder. Within this zone, the full outer diameter of the thread is maintained to provide such thread depth and hence ample channel capacity as to enable passage of fluid plastic forward within the extruder without escape through the opening 52. In the frontward direction of the extruder, the screw core increases in diameter beyond the opening 52 to an extent causing the screw channel to have a depth typical of a conventional metering section.

FIG. 5 illustrates another embodiment of the invention in which a screw 60 received within a barrel 61 has a thread 62 of uniform pitch and diameter. The melting section of the extruder commences approximately with a turn 64 of the thread. A subchannel 65 which commences approximately with turn 64 extends longitudinally forwardly of the remainder of the thread towards the screw end surface 66. In common with the earlier described embodiment, the main channel 66 is considered to extend in its widthwise direction between successive turns of the thread 62. The subchannel 65 extends radially inwardly within the core 68 from the main channel. A spiral shaped solid body of plastic material is supported by the thread and the core surface 69 against the inner surface of the surrounding barrel 71 during operation. External heat supplied to the barrel is transferred into the body of plastic at the interface area of the inner surface of the barrel.

Melting occurs along such interface and is promoted by the thinness of the melt film at the interface caused by the radial pressure exerted on the plastic body by the core surface 69 as the diameter of the core increases in the forward direction of the screw. Throughout the melting section, the thin film of melt produced is wiped toward the front face of the nearest adjacent, rearwardly located turn of the thread. By virtue of the high pressure developed by a slight accumulation of melt along the outer edge of the front face of the thread, the melt is forced radially inwardly along the front thread face into the subchannel 65. Such passage may be promoted by radial grooves 73 shown in FIG. 5a extending from the outer periphery of the thread 74 to the core surface 75 at the bottom of the subchannel.

FIG. 6 illustrates a screw 80 of which only a forward end portion is shown but has thread and subchannel construction somewhat similar to that of the screw 60 of FIG. 5. The screw 80 is modified with respect to the screw 60 to provide a subchannel 82 which attains a maximum depth within the main melting section of the screw and then decreases in depth toward the front end accompanied by an increase of diameter of the core 83 and a corresponding decrease in the height of the thread 84. The front portion of the screw 80 is thus shaped within a surrounding extruder barrel as an extruder section for metering the movement of a fluid plastic from such an extruder. Under conditions known to the operators of extruder equipment, such metering is utilized for obtaining more precise control of the quality and rate of extruder output.

FIGS. 7 and 8 illustrate small portions in lateral and diametral cross sectional views, respectively, of an extruder screw 88 having a main channel region 89 defined generally by successive turns of a thread 91. The screw 88 is shaped to provide a subchannel 92 along and radially inwardly from the rear side 93 of the thread. The main channel core surface 94 has grooves 95 extending in the lengthwise direction of the screw which join the subchannel 92 with a small feed groove 97 extending as a spiral along the base of the front side 98 of the thread 91. The groove 97 may be extended substantially through the length of the melting section or along any section of the screw provided with the longitudinal grooves 95.

In operation, the subchannel 92 provides a main passageway for melt to the front end of the screw. Molten material wiped rearwardly to points in radial registry with the groove 97 passes radially inwardly along the forward face of the thread and then feeds forwardly through grooves 95 to the subchannel 92.

FIG. 9 fragmentarily illustrates in section an extruder in which the screw 100 has a thread 101 of uniform pitch defining a main channel 102 within which a spiral solid body of plastic is supported by the main channel core surface 103 against the barrel 6. Throughout the melting section of the extruder, the screw 100 is formed with a plurality of narrow subchannels 104 extending in spiral conformity with the thread throughout the melting section of the screw. Subchannels 104 are connected crosswise of the main channel by a plurality of grooves typified by groove 105.

FIG. 10 is a fragmentary view of another extruder in which a screw 110 has a thread 111 formed with a groove 112 which follows the length of the thread through the melting section of the parent extruder. The groove 112, normally of uniform depth, divides the thread into a spiral-shaped longitudinal portion 114 of full diameter, preventing substantially any leakage of material from turn to turn of the screw. The forward portion 115 of the thread is of less diameter than portion 114 for the purpose of facilitating the passage of melt wiped from the interface at 117 of the plastic body 118 with the barrel 6 rearwardly toward the thread 111. The thread 111 is formed with a plurality of apertures 121 which extend radially inwardly and rearwardly from the groove 112 into a subchannel 122 formed in undercut relation with the main channel as defined between successive turns of the thread 111. Any melt developed at the interface is collected in the relatively low pressure region of the screw comprising the groove 112, the openings 121 and the subchannel 122. The subchannel 122 extends throughout the length of the melting section of the extruder in a manner hereinbefore described. Thus, during operation, the pumping action of the screw forwards the fluid contained within the subchannel 122 toward the front end of the extruder in a manner achieved in the use of the other embodiments herein described.

This invention, as the above description indicates, is directed primarily to structure defining one or more subchannels formed radially inwardly with respect to the main channel of the screw for passage of melt toward the front end of the screw without any substantial mixing with the essentially solid spiral body of unmelted plastic, the latter being supported essentially in the main channel between successive turns of the thread without substantial intrusion into a secondary channel. FIGS. 3a, 8 and 10 illustrate that, when the subchannel is located along the rear side of the thread, the solid body of plastic may not always occupy the entire turn-to-turn dimension of the main channel. This indicates that the width of the channel may be smaller and gradually reduced. While the figures of the drawing which indicate the full lengths of screws are drawn with threads of uniform pitch, it is within the scope of the main invention to vary the pitch, for example, to gradually reduce the width of the channel in the rear-to-front direction of the screw.

What is claimed is:

1. An extruder having a rotatable screw and a barrel enclosing said screw:

said screw comprising a core and a thread so interrelated in shape as to define a continuous spiral main channel through which material is traversed forwardly to the front discharge end of the extruder, said screw having a melt section extending through a substantial portion of the length of the main channel;

said thread being of substantially uniform pitch and width throughout said melt section, said core being shaped to define the bottom surface of the main channel substantially parallel to the screw axis, a relatively narrow portion of said bottom surface being radially undercut with respect to the remaining portion throughout said melt section to define a subchannel for the escape of melted plastic to said front end, said remaining portion being relatively wide with respect to said narrow portion to provide substantial support for a body of said solid material between adjacent turns of the thread exteriorly of the subchannel without substantial intrusion of said body into said subchannel.

2. The extruder of claim 1 wherein:

said subchannel extends along the rear side of said thread and the thread has openings slanting radially inwardly and rearwardly therethrough from a surface along the front side of the thread into said subchannel for flowing of liquid rearwardly through the thread from a channel region adjacent the front side of the thread.

3. The extruder of claim 1 wherein:

said subchannel extends along the rear side of the thread and the thread has a peripheral bevel surface tapering frontwardly toward and joining with the leading side of the thread; and the thread has openings slanting radially inwardly and rearwardly from said bevel surface and joining with said subchannel for the passage of liquid rearwardly through the thread from the front side thereof.

4. The extruder of claim 1 wherein:

said subchannel extends along the rear side of said thread; and said channel bottom surface has axially extending grooves extending completely crosswise of said remaining portion of the bottom surface.

5. The extruder of claim 1 wherein:

a plurality of said subchannels are provided in said channel bottom surface which extend in spiral conformity with the thread; and said bottom surface provides a plurality of axially extending grooves interconnecting said subchannels.

6. The extruder of claim 1 wherein:

the screw provides a subchannel adjacent the rearside of said thread and a groove within the outer periphery of said thread separated by adjacent frontward channel portion by a ridge of the thread of less radial height than that of maximum radius separating the groove from the subchannel; and said thread, having a plurality of openings connecting said groove with said channel, said openings slanting radially inwardly and rearwardly through said thread portion of maximum radius for the passage of liquid collected in said groove into said subchannel.

7. The extruder of claim 1 wherein:

said subchannel is of uniform width throughout its length and increasing radial depth in the forward direction of the extruder.

8. The extruder of claim 7 wherein:

said subchannel extends to and emerges in the front end of the screw.

9. An extruder having a rotatable screw and a barrel enclosing said screw:

said screw comprising a core and a thread so interrelated in shape as to define a continuous spiral main channel through which material is traversed forwardly to the front discharge end of the extruder, said screw having a melt section extending through a substantial portion of the length of the main channel;

said core being shaped to define the bottom surface of the main channel substantially parallel to the screw axis, a relatively narrow portion of said bottom surface being radially undercut with respect to the remaining portion throughout said melt section to define a subchannel for the escape of melted plastic to said front end, said remaining portion being relatively wide with respect to said narrow portion to provide substantial support for a body of said solid material between adjacent turns of the thread exteriorly of the subchannel without substantial intrusion of said body into said subchannel.

* * * * *